United States Patent [19]

Mochimaru et al.

[11] Patent Number: 5,241,426
[45] Date of Patent: Aug. 31, 1993

[54] CONDENSER OPTICAL SYSTEM

[75] Inventors: Shoichiro Mochimaru; Yoshiaki Horikawa, both of Hachiouji, Japan

[73] Assignee: Olympus Optical Co., Ltd., Tokyo, Japan

[21] Appl. No.: 872,072

[22] Filed: Apr. 22, 1992

[30] Foreign Application Priority Data

Apr. 26, 1991 [JP] Japan .................... 3-097414

[51] Int. Cl.⁵ .............................. G02B 5/08
[52] U.S. Cl. ............................. 359/869; 378/82; 378/84; 378/145
[58] Field of Search ............... 359/850, 857, 858, 867, 359/868, 869; 378/43, 70, 73, 145, 147, 150, 82, 84

[56] References Cited

U.S. PATENT DOCUMENTS

| | | | |
|---|---|---|---|
| 2,474,240 | 6/1949 | Friedman | 378/84 |
| 2,557,662 | 6/1951 | Kirkpatrick | 378/43 |
| 3,079,501 | 2/1963 | Birks, Jr. | 378/43 |
| 3,821,556 | 6/1974 | Hoover | 378/43 |
| 4,370,750 | 1/1983 | Hoover | 378/43 |
| 4,562,583 | 12/1985 | Hoover et al. | 378/43 |
| 4,941,163 | 7/1990 | Hoover | 378/43 |

FOREIGN PATENT DOCUMENTS

| | | |
|---|---|---|
| 61-102600 | 5/1986 | Japan . |
| 61-292600 | 12/1986 | Japan . |
| 0717330 | 10/1954 | United Kingdom ........ 378/43 |

*Primary Examiner*—Bruce Y. Arnold
*Assistant Examiner*—R. D. Shafer
*Attorney, Agent, or Firm*—Cushman, Darby & Cushman

[57] ABSTRACT

A condenser optical system is provided for bringing a beam of light from a light source to a focus at a desired position. The condenser optical system has a reflecting surface including a quadric surface of revolution represented by Equation (1) described below. The reflecting surface satisfies the conditions of Equations (2) and (3) described below when the condenser optical system is disposed so that the light beam from the light source is incident, substantially parallel to a rotary axis of the quadric surface, on the reflecting surface:

$$z = Cy^2/\{1+(1-pC^2y^2)^{\frac{1}{2}}\} \quad (1)$$

$$Ch < 22 \quad (2)$$

$$78 - 4\theta_N < Ch \quad (3)$$

where z and y are coordinates when the rotary axis of the reflecting surface is taken as the z axis and the perpendicular to the z axis is taken as the y axis, with the point where the z axis intersects with the reflecting surface as the origin of coordinate, C is the curvature at the vertex on the z axis of the quadric surface of revolution including the reflecting surface, h is the distance from the center line of a beam of light incident on the reflecting surface to the z axis, $\theta_N$ is the grazing angle of a ray, closest to the z axis, of the beam incident on the reflecting surface, and p is the conical coefficient.

3 Claims, 3 Drawing Sheets

CONDENSER OPTICAL SYSTEM

BACKGROUND OF THE INVENTION a) Field of the invention:

This invention relates to a condenser optical system used in combination with a light source emitting beams of light with good parallelizing properties such as beam lines of synchrotron radiation (SOR) and X-ray lasers.

b) Description of the prior art:

In general, the value of the refractive index of a substance is close to unity in a soft X-ray region, which fact makes it impossible to utilize a refracting optical system used for visible light and an ordinary reflecting optical system. Hence, a normal-incidence multilayer film optical system, a grazing incidence optical system, or a zone plate is used and in the case of nearly parallel light like SOR in particular, the grazing incidence optical system or the zone plate has been employed for a condenser optical system in the past.

The grazing incidence optical system forms a reflecting mirror by making use of the total reflection of soft X rays where their angles of incidence are near 90° for grazing incidence, that is, to make the rays incident on the surface of the mirror, grazing it. Such grazing incidence optical systems are available in, for example, K-B (Kirkpatrick-Baez) and Wolter types. The K-B type optical system, as shown in FIG. 1, comprises two spherical or cylindrical mirrors arranged at right angles with each other and has the advantage that its manufacture is easy. The Wolter type optical system, as shown in FIG. 2, is constructed from the combination of a hyperboloid of revolution with an ellipsoid of revolution so that the focal points of these aspherical surfaces are in common. This type, which uses the aspherical surfaces, is small in aberration and wide in field of view compared with the K-B type optical system.

On the other hand, the zone plate is an imaging element making use of diffraction and, as depicted in FIG. 3, assumes a flat sheet consisting of the zones of concentric circles in which every other zone is formed to be opaque in respect of soft X-rays. The opaque zones, for which gold absorbing easily X rays is used, are usually made by electron-beam lithographic and holographic methods. The relationship between a radius $r_n$ of the circle of the n-th zone from the center of the zone plate and a focal length f is given by $rn^2 = nf\lambda$, where $\lambda$ is the wavelength which has the relationship of $f = r1^2/\lambda$.

A microscope utilizing the SOR needs an objective lens of a large NA (numerical aperture) for observation of a sample with high resolution and in this case, the condenser optical system also needs the NA to increase. Further, since it is desirable for the condenser optical system that its convergence efficiency is high, the grazing incidence optical system needs a grazing angle as small as possible in order to increase reflectance with respect to soft X rays. Thus, where various types of optical systems mentioned above make use of the condenser optical system for the SOR, there are problems to be considered.

The K-B type optical system first has the problem that if parallel beams are intended to be brought into a focus, aberration will increase, and suffers the inconvenience that if aberration is intended to be reduced, the NA cannot be increased. Additionally, the size of each mirror surface is inevitably increased and alignment is required for a two-mirror arrangement.

The Wolter type optical system, on the other hand, is very difficult of manufacture due to the facts that a thin straight, cylindrical shape is assumed and a high degree of accuracy of asphericity is required for the ellipsoid and hyperboloid mentioned above.

In the case of the zone plate, the zone width becomes narrow progressively in going from the center to the periphery and when $dr_n$ is taken as the minimum zone width, the numerical aperture is given by $NA = \lambda/2\, dr_n$, but when $dr_n = 25$ nm and $\lambda = 10$ nm in particular, the numerical aperture will be $NA = 0.2$. Hence, it is extremely difficult to obtain the NA of greater than 0.25.

SUMMARY OF THE INVENTION

It is, therefore, the object of the present invention to provide a condenser optical system in which a large NA and high reflectance can be secured in terms of parallel incident light of a soft X-ray region in particular and its manufacture is facilitated.

The condenser optical system according to the present invention, bringing beams of light from a light source into a focus at a desired position, has particularly a reflecting surface composed of a quadric surface of revolution. When the quadric surface is expressed by Equation (1) described below, the condenser optical system satisfies the conditions of Equations (2) and (3):

$$z = Cy^2 / \{1 + (1 - pC^2 y^2)^{\frac{1}{2}}\} \quad (1)$$

$$Ch < 22 \quad (2)$$

$$78 - 4\theta_N < Ch \quad (3)$$

where z and y are coordinates when the rotary axis of the reflecting surface is taken as the z axis and the perpendicular to the z axis is taken as the y axis, with the point where the z axis intersects with the reflecting surface as the origin of coordinate, C is the curvature at the vertex on the z axis of the quadric surface of revolution including the reflecting surface, h is the distance from the center line of a beam of light incident on the reflecting surface to the z axis, $\theta_N$ is the grazing angle of a ray, closest to the z axis, of the beam incident on the reflecting surface, and p is the conical coefficient.

According to the present invention, the condition of Equation (2) establishes the relation which restricts the balance between the diameter of the incident beam and the length of the reflecting surface along the rotary axis, and if the result of the condition exceeds the upper limit, the reflecting surface will excessively be large in terms of the beam diameter, with the resultant extreme difficulty in its manufacture and handling. The left side Ch, which is the product of the curvature at the vertex on the z axis of the quadric surface of revolution including the reflecting surface and the distance from the center line of the incident beam to the z axis, satisfies the condition of Equation (3) in the relation with the grazing angle of a ray, closest to the z axis, of the beam incident on the reflecting surface, thereby securing the numerical aperture as large as 0.25 or more.

This and other objects as well as the features and the advantages of the present invention will become apparent from the following detailed description of the preferred embodiments when taken in conjunction with the accompanying drawings.

DETAILED DESCRIPTION OF THE PREFERRED EMBODIMENTS

Figure 1:
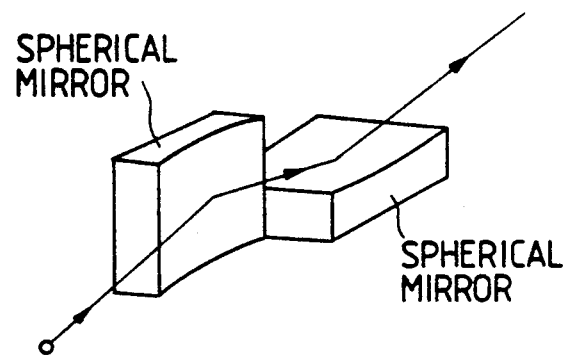
FIG. 1 is a perspective view showing the arrangement of a conventional K-B type optical system.
Figure 2:
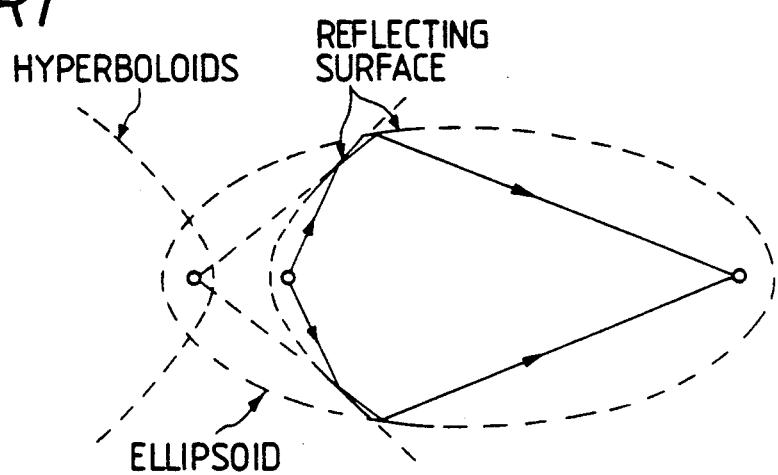
FIG. 2 is a view showing the geometry of a conventional Wolter type optical system.
Figure 3:
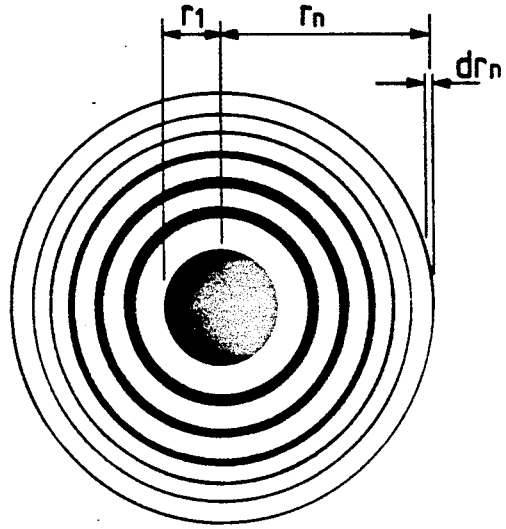
FIG. 3 is a view showing the geometry of a conventional zone plate.
Figure 4:
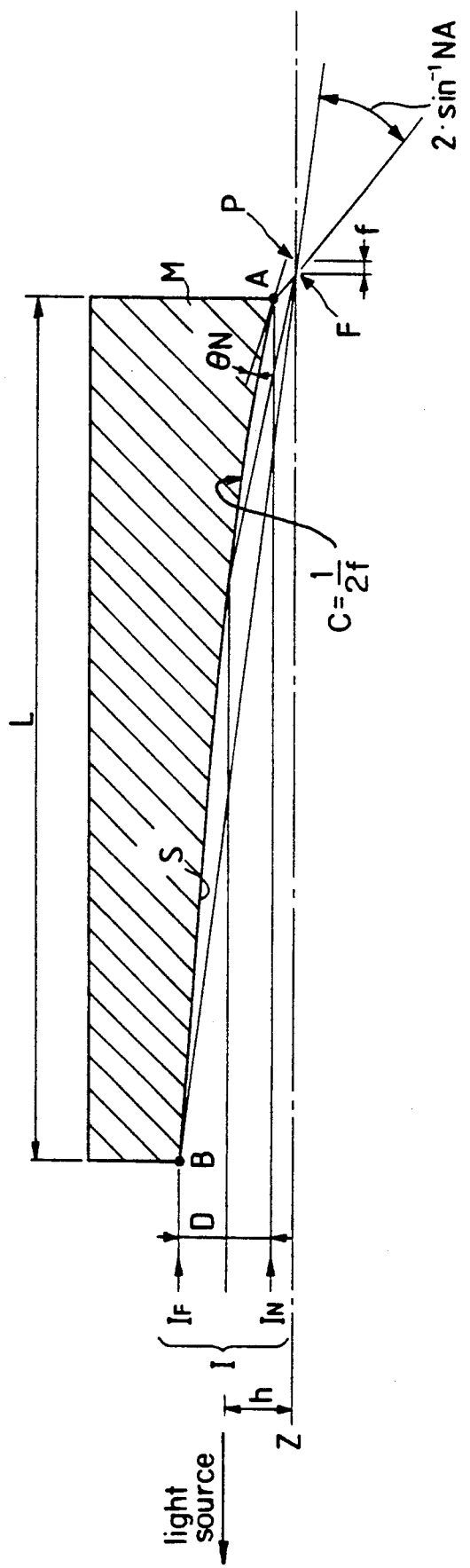
FIG. 4 is a view showing the configuration and functional principle of a first embodiment of a condenser optical system according to the present invention.

In accordance with FIG. 4, the first embodiment of the condenser optical system according to the present invention will be described below. A reflecting surface S of a mirror M, although configured to a quadric surface of revolution in this figure, here assumes the shape of a paraboloid of revolution.

In the first embodiment also, a light source is employed which emits light with good directionality such as SOR and the mirror M is arranged so that the rotary axis of the reflecting surface S, namely, the Z axis is parallel to incident light I. In the figure, reference symbol D represents the beam diameter of the incident light I; L the length of the mirror M along the rotary axis; h the distance from the center of the beam of the incident light I to the rotary axis; and f the distance from a vertex P of the reflecting surface S to a focal point F. The reflecting surface S satisfies Equations (2) and (3) described above.

In the foregoing, a ray $I_N$, closest to the rotary axis of the reflecting surface S, of the incident light I and a ray $I_F$ farthest therefrom are reflected at points A and B on the reflecting surface S, respectively, and intersect with each other at the focal point F, in which the sine of half of their crossing angle represents a numerical aperture NA. The grazing angle $\theta_N$ of the ray incident on the reflecting-surface S increases as the ray becomes close to the rotary axis, and its reflectance therefore diminishes. Thus, a reflectance $R_A$ is minimized in terms of the ray $I_N$, closest to the rotary axis, of the incident light I, so that such is taken as the reflectance of this optical system.

Here, the relationship between the grazing angle $\theta_N$ of the ray $I_N$ incident on the reflecting surface S and the reflectance $R_A$ is expressed, according to the Fresnel formula, by $$R_A = R_e\{(R_p R_p^* + R_S R_S^*)/2\} \quad (4)$$

where $R_p$ and $R_S$ are components parallel and normal to the incident surface, respectively, and expressed, using a refractive index n of the substance of the reflecting surface S, by $$R_p = (n \sin \theta_N - \cos \theta)/(n \sin \theta_N + \cos \theta) \quad (5)$$

$$R_S = (\sin \theta_N - n \cos \theta)/(\sin \theta_N + n \cos \theta) \quad (6)$$

where $\cos \theta = \{1 - (\cos \theta_N/n)^2\}^{\frac{1}{2}}$.

The refractive index n depends on the wavelength of the incident light, and the kind of substance of the reflecting surface S is so chosen that a desired reflectance $R_A$ is derived from the wavelength and the grazing angle $\theta_N$.

The condenser optical system according to the present invention is constructed as mentioned above, and by forming the reflecting surface S into the quadric surface of revolution, that is, the paraboloid of revolution in this example, the incident light I parallel to the rotary axis is converged at the focal point F, with the result that there is no aberration theoretically. Further, because of the paraboloid, the mirror M, even with a larger NA, can be compactly constructed from a simple design. Additionally, the paraboloid need not be formed over the entire periphery around the rotary axis, so that, for example, it is necessary only to use a half of the paraboloid cut by a plane including the rotary axis. In this case, the mirror can easily be made of the block of raw material by the NC process.

Figure 5:
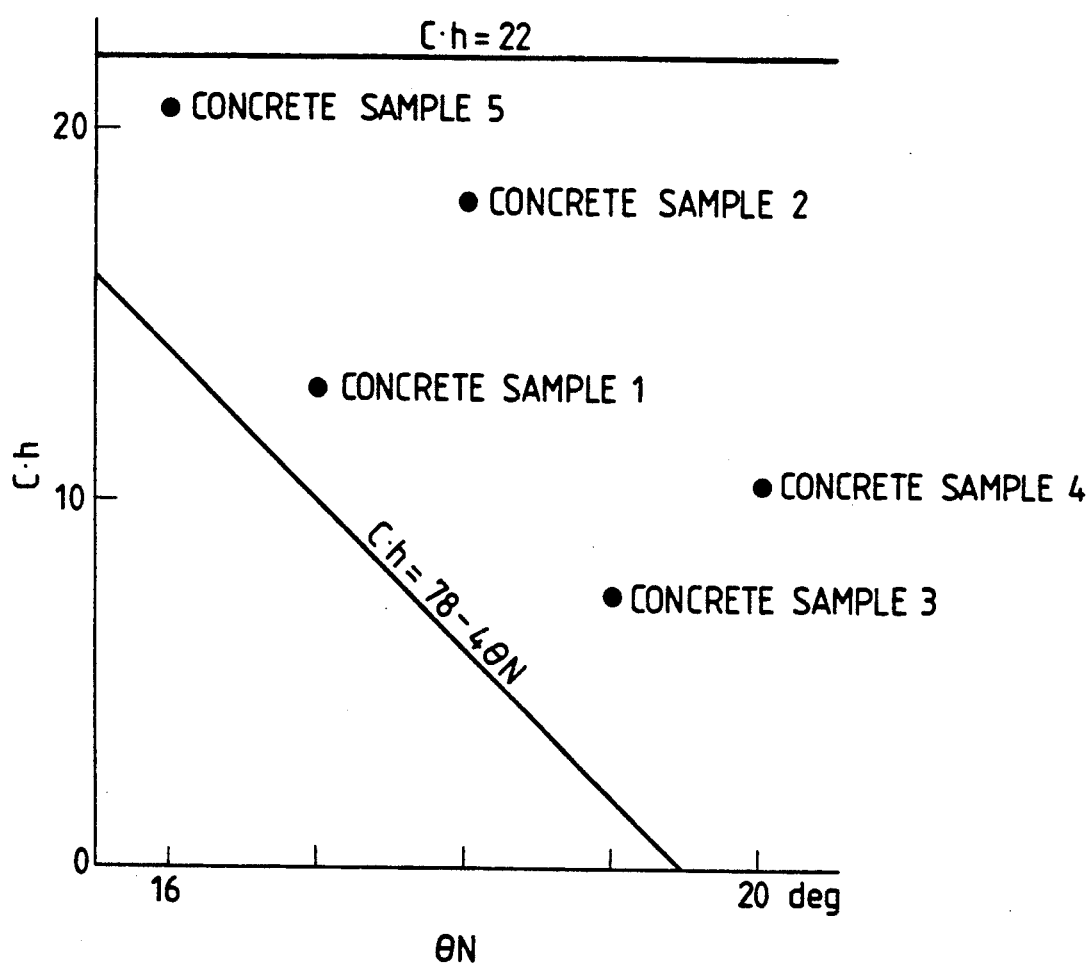
FIG. 5 is a graph showing the relationship between the grazing angle in each concrete example of the condenser optical system made for the first embodiment and the product of the curvature at the vertex on the z axis of the quadric surface of revolution including the reflecting surface and the distance from the center line of the incident beam to the z axis.

Here, the concrete examples of the first embodiment are represented by the specific numerical values listed in Tables 1 through 5 shown below, the relationship between which is given by the graph in FIG. 5.

TABLE 1

| | | | |
|---|---|---|---|
| λ (nm) | 13.55 | NA | 0.25 |
| D (mm) | 3.2 | L (mm) | 41.71 |
| $\theta_N$ (deg) | 17.0 | h (mm) | 2.16 |
| $R_A$ (%) | 72.7 | f (mm) | 0.083 |
| Substance of reflecting surface | Mo | C (1/mm) | 6.00 |

TABLE 2

| | | | |
|---|---|---|---|
| λ (nm) | 11.4 | NA | 0.28 |
| D (mm) | 3.0 | L (mm) | 53.52 |
| $\theta_N$ (deg) | 18.0 | h (mm) | 1.80 |
| $R_A$ (%) | 39.5 | f (mm) | 0.050 |
| Substance of reflecting surface | Au | C (1/mm) | 10.00 |

TABLE 3

| | | | |
|---|---|---|---|
| λ (nm) | 10.87 | NA | 0.25 |
| D (mm) | 2.4 | L (mm) | 18.43 |
| $\theta_N$ (deg) | 19.0 | h (mm) | 1.92 |
| $R_A$ (%) | 61.6 | f (mm) | 0.125 |
| Substance of reflecting surface | Ag | C (1/mm) | 4.00 |

TABLE 4

| | | | |
|---|---|---|---|
| λ (nm) | 10.87 | NA | 0.29 |
| D (mm) | 2.6 | L (mm) | 26.69 |
| $\theta_N$ (deg) | 20.0 | h (mm) | 1.74 |
| $R_A$ (%) | 55.9 | f (mm) | 0.083 |
| Substance of reflecting surface | Ag | C (1/mm) | 6.00 |

TABLE 5

| | | | |
|---|---|---|---|
| λ (nm) | 9.34 | NA | 0.25 |
| D (mm) | 2.8 | L (mm) | 58.31 |
| $\theta_N$ (deg) | 16.0 | h (mm) | 1.71 |
| $R_A$ (%) | 65.4 | f (mm) | 0.042 |
| Substance of reflecting | Ag | C (1/mm) | 12.00 |

As will be obvious from the above tables, the reflectance $R_A$ can be remarkably improved and the numerical aperture takes a large value of NA=0.25 or more.

In a second embodiment of the condenser optical system according to the present invention, the reflecting surface S of the mirror M is configured to an ellipsoid of revolution. The other geometry is the same as in the first embodiment. The concrete example according to the second embodiment is represented by the specific numerical values listed in Table 6 shown below, in which a and b are lengths of the major axis (along the rotary axis) and minor axis of the ellipsoid, respectively.

TABLE 6

| a (mm) | 8333.33 | b (mm) | 26.35 |
|---|---|---|---|
| λ (nm) | 9.34 | NA | 0.25 |
| D (mm) | 2.8 | L (mm) | 58.31 |
| $\theta_N$ (deg) | 16.0 | h (mm) | 1.71 |
| $R_A$ (%) | 65.4 | f (mm) | 0.042 |
| Substance of reflecting surface | Ag | C (l/mm) | 12.00 |

In the second embodiment also, the same functional effect as the first embodiment can be brought about by forming the reflecting surface S of the mirror M into the ellipsoid as the quadric surface of revolution.

What is claimed is:

1. A condenser optical system for bringing a beam of light from a light source to a focus at a desired position, wherein said condenser optical system has a reflecting surface comprising a quadric surface of revolution represented by Equation (1) described below, said reflecting surface satisfying the conditions of Equations (2) and (3) described below when said condenser optical system is disposed so that said light beam from the light source is incident, substantially parallel to a rotary axis of said quadric surface, on said reflecting surface:

$$z = Cy^2/\{1+(1-pC^2y^2)^{\frac{1}{2}}\} \qquad (1)$$

$$Ch < 22 \qquad (2)$$

$$78 - 4\theta_N < Ch \qquad (3)$$

where z and y are coordinates when the rotary axis of the reflecting surface is taken as the z axis and the perpendicular to the z axis is taken as the y axis, with the point where the z axis intersects with the reflecting surface as the origin of coordinate, C is the curvature at the vertex on the z axis of the quadric surface of revolution including the reflecting surface, h is the distance from the center line of a beam of light incident on the reflecting surface to the z axis, $\theta_N$ is the grazing angle of a ray, closest to the z axis, of the beam incident on the reflecting surface, and p is the conical coefficient.

2. The condenser optical system according to claim 1, wherein said quadric surface is a paraboloid of revolution.

3. The condenser optical system according to claim 1, wherein said quadric surface is an ellipsoid of revolution.

* * * * *